Feb. 19, 1929.　　　C. B. GUNN ET AL　　　1,702,601
DEMOUNTABLE RIM
Filed July 17, 1925　　　2 Sheets-Sheet 1
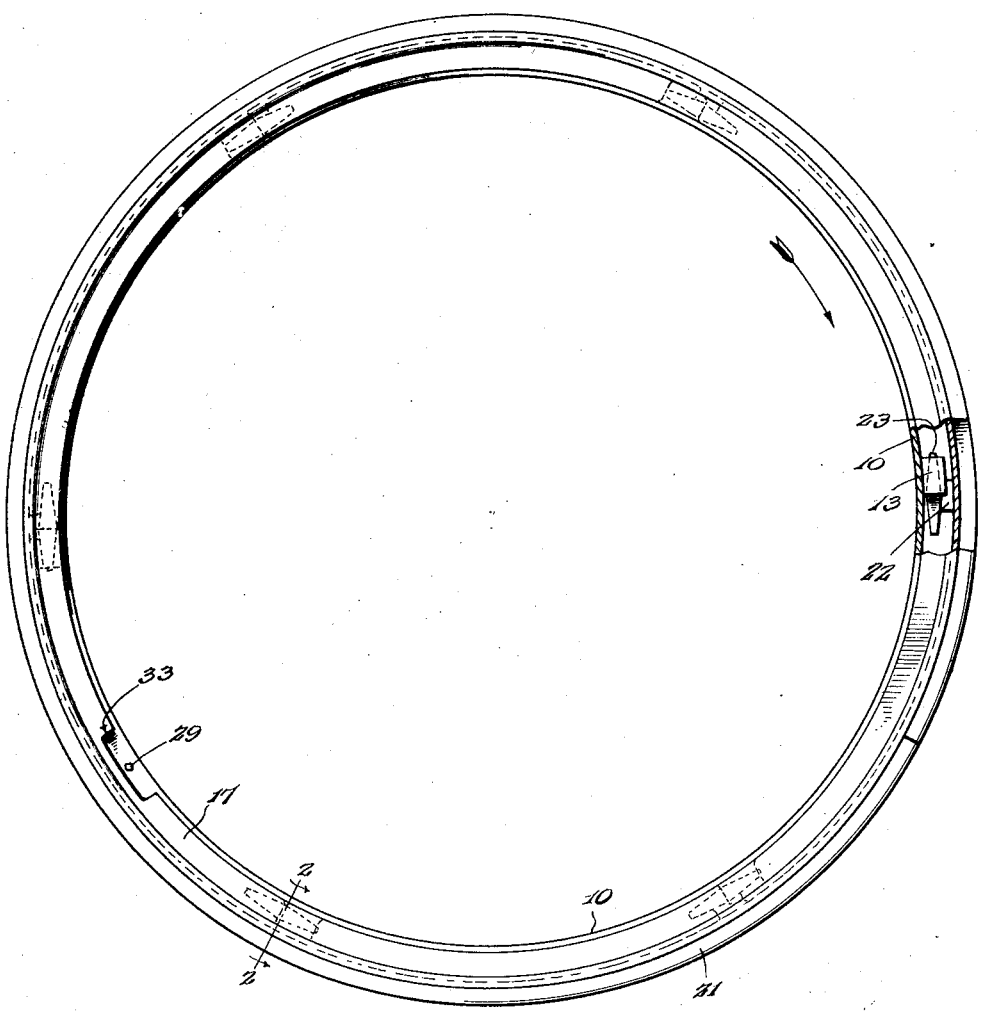
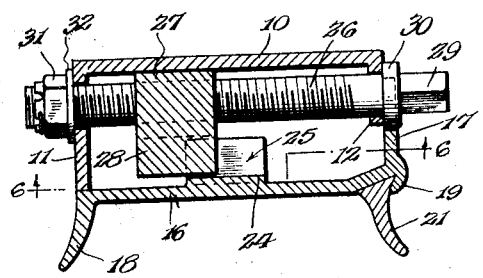
Inventors
C. B. Gunn.
A. J. Dohogne.
By Lacey & Lacey, Attorneys Feb. 19, 1929.
C. B. GUNN ET AL
1,702,601
DEMOUNTABLE RIM
Filed July 17, 1925    2 Sheets-Sheet 2
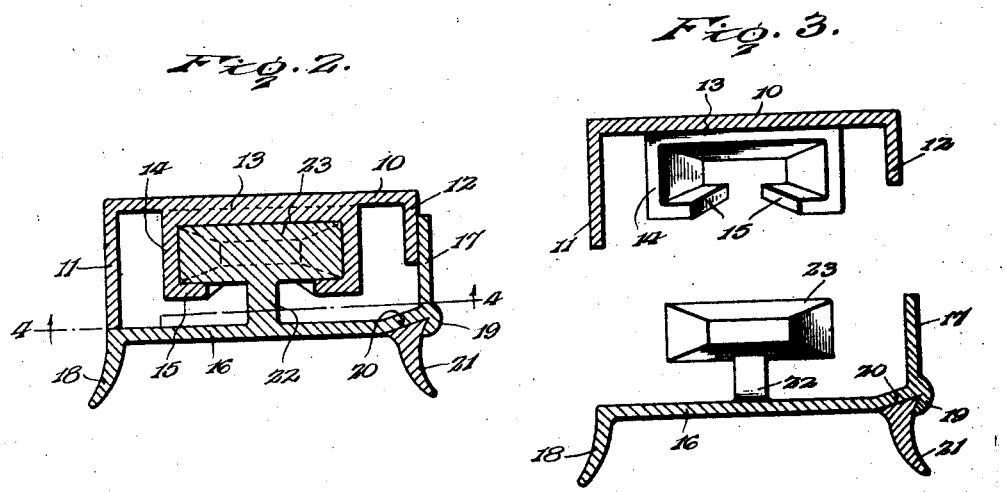
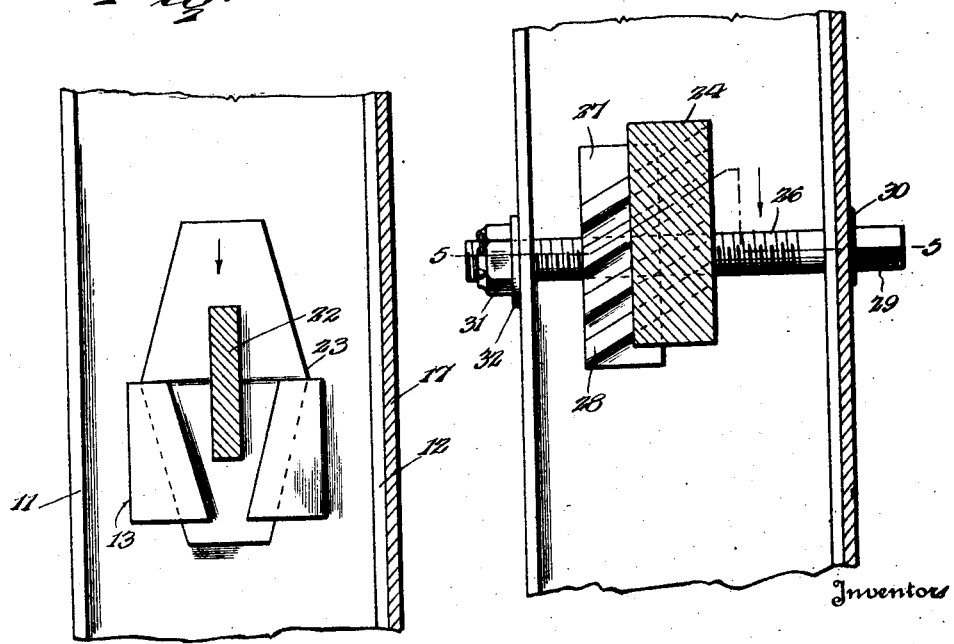
Inventors
C. B. Gunn.
A. J. Dohogne.
By Lacy & Lacy, Attorneys Patented Feb. 19, 1929.

1,702,601

UNITED STATES PATENT OFFICE.

CHARLES B. GUNN AND ALBERT J. DOHOGNE, OF SHAWNEE, OKLAHOMA.

DEMOUNTABLE RIM.

Application filed July 17, 1925. Serial No. 44,288.

This invention relates to an improved demountable rim especially designed for use in connection with motor vehicles and seeks, among other objects, to provide a construction wherein the rim will be rigidly and securely held upon the wheel in alinement with the felly band but wherein the rim may be readily removed.

The invention seeks, as a further object, to provide a novel connection between the felly band and rim, wherein the rim will be wedged in engagement with the felly band.

And the invention seeks, as a still further object, to provide an improved means for rotating the rim into wedged engagement with the felly band and locking the rim against accidental independent retrograde movement.

Other and incidental objects will appear hereinafter.

In the accompanying drawings:

Figure 1 is a side elevation of our improved felly and rim.

Figure 2 is an enlarged sectional view on the line 2—2 of Figure 1, looking in the direction indicated by the arrows.

Figure 3 is a view similar to Figure 2, but showing the felly band and rim separated.

Figure 4 is a sectional view on the line 4—4 of Figure 2, looking in the direction indicated by the arrows.

Figure 5 is a transverse sectional view on the line 5—5 of Figure 6, this view particularly showing the thrust blocks for rotating the rim.

Figure 6 is a sectional view on the line 6—6 of Figure 5, looking in the direction indicated by the arrows, this view also showing the thrust blocks.

In carrying the invention into effect, we employ a channel-shaped felly band 10 which may be fixed upon the felly of a wheel in any approved manner and is provided with a wide annular side flange 11 and a narrow annular side flange 12. Integrally formed on the base of the felly band, at suitably spaced points, are tapered sockets 13 having side walls 14 and outer flanges 15 converging toward corresponding ends of the sockets.

In conjunction with the felly band 10, we provide a rim 16 which, at one edge margin thereof snugly surrounds the flange 11 of the felly band, while at its opposite edge margin the rim is provided with an inwardly directed annular flange 17 which overlies the flange 12 of said band. Formed on the rim at the former margin mentioned is an outwardly directed annular tire engaging flange 18 and formed on the rim at the latter margin thereof is an annular lip 19 at the inner side of which is an annular V-shaped channel 20. Removably seated at its base in said channel is a split resilient ring 21 disposed to cooperate with the flange 18 for removably securing a tire upon the rim. Rising from the base of the rim at its inner circumference is a plurality of T-shaped wedge members having relatively wide flat stems 22 integral with the rim and provided with double-ended heads 23, the ends of which are substantially frusto pyramidal and are shaped to wedge in the sockets 13 of the felly band.

Integrally formed on the base of the rim is an oblong thrust block 24 having diagonal teeth 25, and journaled through the flanges 11 and 12 of the felly band 10 is a transversely extending shaft 26 upon which is screwed a similar thrust block 27 having diagonal teeth 28 disposed to slidably mesh with the teeth 25. At one end, the shaft 26 is provided with a squared wrench receiving head 29 at the base of which is an annular flange 30 to coact with the flange 12 of the felly band, and screwed on the opposite end of said shaft is a nut 31 cooperating with a washer 32. Thus, the shaft is secured against displacement while the nut will cooperate with the flange 30 of the shaft for limiting the shaft against endwise movement. Formed in the flange 17 of the rim to accommodate the head 29 of the shaft is a notch 33.

To apply the rim, corresponding ends of the heads 23 of the wedge members of the rim are, as shown in Figure 1, engaged in the sockets 13 of the felly band 10, in which position of the rim, the thrust block 24 is disposed for engagement by the thrust block 27. Accordingly, the shaft 26 is turned to advance the block 27 along the shaft until the teeth 28 of said block are engaged with the adjacent ends of the teeth 25 of the block 24. As will thus be seen, the shaft 26 may then be adjusted for shifting the block further along the shaft transversely of the rim, when the teeth of said block will be caused to coact with the teeth of the block 24 for rotating the rim about the felly band and tightly wedging said ends of the heads 23 of the wedge members in the sockets 13. The rim will thus be rigidly and securely connected with said band while the thrust on the block 27 will cause said block to hold the shaft against rotation so that the rim will thus be locked against accidental retrograde movement. However, the rim may, of course, be readily released by counter-rotating the shaft when, upon the freeing of the rim, said rim may be freely slipped from the felly band.

The heads 23 of the wedge members are double-ended in order that the rim may be applied either to a right wheel of a vehicle or a left wheel thereof while provision is thus made whereby the forward rotation of the wheel, whether a right or left wheel, will tend to tighten the engagement of the wedge members in the sockets of the felly band. As will be observed, when the block 27 is advanced into engagement with the block 24 from the left, as seen in Figure 5, the rim will be rotatably advanced in one direction while, when the block 27 is advanced into engagement with the block 24 from the right, the rim will be rotatably advanced in the opposite direction.

Having thus described the invention, what we claim is:

In a vehicle wheel, a felly band and rim, said band having sockets carried thereby including convergingly arranged side walls and spaced top flanges carried thereby, stems extending from the rim and elongated circumferentially of the rim, and heads carried by said stems, said heads extending from opposite sides and ends of the stem and decreasing in width and thickness towards their ends to provide tapered end portions for engagement with the walls and flanges of the sockets when the stems are disposed between said flanges.

In testimony whereof we affix our signatures.

CHARLES B. GUNN. [L. S.]
ALBERT J. DOHOGNE. [L. S.]